United States Patent
Sung et al.

(10) Patent No.: US 7,774,011 B2
(45) Date of Patent: Aug. 10, 2010

(54) METHOD, UE AND SYSTEM FOR PROVIDING SIMULTANEOUS MULTIPLE SESSION POC MULTIMEDIA SERVICE IN POC SYSTEM

(75) Inventors: Sang-Kyung Sung, Seoul (KR); Ji-Hye Lee, Seoul (KR); Sung-Jin Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 778 days.

(21) Appl. No.: 11/599,802

(22) Filed: Nov. 15, 2006

(65) Prior Publication Data
US 2007/0121526 A1 May 31, 2007

(30) Foreign Application Priority Data
Nov. 15, 2005 (KR) .................... 10-2005-0109385

(51) Int. Cl.
*H04Q 7/20* (2006.01)
(52) U.S. Cl. .................... 455/518; 455/519; 455/517; 455/500; 455/426.1; 455/414.1; 370/310; 370/328; 370/329; 370/338; 370/349; 709/202; 709/204; 709/206; 709/207; 709/214

(58) Field of Classification Search ................. 455/518, 455/519, 517, 500, 466, 426.1, 426.2, 403, 455/422.1, 550.1, 412.1, 412.2, 414.1–414.4, 455/445, 452.1–453; 370/310, 328, 329, 370/352, 349, 338; 709/202, 203, 204, 206, 709/207, 214, 216, 226
See application file for complete search history.

(56) References Cited

U.S. PATENT DOCUMENTS

| 2003/0223381 | A1 | 12/2003 | Schroderus |
| 2004/0120474 | A1 | 6/2004 | Lopponen et al. |
| 2004/0190468 | A1 | 9/2004 | Saijonmaa |
| 2004/0223489 | A1* | 11/2004 | Rotsten et al. ............. 370/352 |
| 2005/0124365 | A1* | 6/2005 | Balasuriya et al. .......... 455/518 |
| 2005/0190740 | A1* | 9/2005 | Zhao et al. ................. 370/349 |

* cited by examiner

*Primary Examiner*—Keith T Ferguson
(74) *Attorney, Agent, or Firm*—The Farrell Law Firm, LLP (57) ABSTRACT

Disclosed are a method, a User Equipment (UE) and a system for providing a simultaneous multiple session Push-to-talk over Cellular (PoC) multimedia service. A PoC client performing a PoC multimedia communication service participates in multiple sessions according to the setup of a user, and can simultaneously receive the same media streams without filtering in a PoC server when the same media streams are transmitted. Further, the PoC client can set a session, to which filtering is to be applied, from among a plurality of sessions and media types.

14 Claims, 8 Drawing Sheets

PUBLISH sip:pfb_server@example.domain.com SIP/2.0
Via: SIP/2.0/UDP client_bpc.domain.com;branch=z9hG4bK776sgdkse
From: <sip:client_b@domain.com>;tag=49583
To: <sip:pfb_server@example.domain.com>
Call-ID: asd88asd77a@client_apc.domain.com
CSeq: 80 PUBLISH
Max-Forwards: 70
Accept-Contact: *;+g.poc.talkburst;require;explicit
Event: poc-settings
Content-Type: application/poc-settings+xml
Content-Length: <appropriate value>

<?xml version="1.0" encoding="UTF-8"?>
<poc-settings
    xmlns="urn:oma:params:xml:ns:poc:poc-settings"
    xmlns:xsi="http://www.w3.org/2001/XMLSchema-instance"
    xsi:schemaLocation="urn:oma:params:xml:ns:poc:poc-settings">

<am-settings>
        <answer-mode>automatic</answer-mode>
    </am-settings>

<note>Multiple PoC Session in Active Configuration</note>
        <msa-settings>
            <msa active="true">
                <msa-video active="true">
                <msa-audio active="true">
                <msa-text active="false">
                <msa-image active="false">
                <msa-no active="2">
        </msa-settings>

</poc-settings>>

FIG.6

```
<?xml version="1.0" encoding="UTF-8"?>
<xs:schema targetNamespace="urn:oma:params:xml:ns:poc:poc-settings"
xmlns="urn:oma:params:xml:ns:poc:poc-settings"
xmlns:xs="http://www.w3.org/2001/XMLSchema"
elementFormDefault="qualified"
attributeFormDefault="unqualified">
Max-Forwards: 70

<xs:import namespace="http://www.w3.org/XML/1998/namespace"
schemaLocation="http://www.w3.org/2001/xml.xsd"/>
<xs:annotation>
<xs:documentation xml:lang="en">
XML Schema Definition in support of ... and multiple PoC Session in Active service in the
Push-to-talk over Cellular (PoC) service.
</xs:documentation>
</xs:annotation>
```

FIG.7A

```
<xs:element name="poc-settings" type="poc-settingsType"/>
<xs:complexType name="poc-settingsType">
<xs:sequence>
<xs:element name="msa-settings" type="msaSettingType"
minOccurs="0"maxOccurs="unbounded"/>
<xs:any namespace="##other" processContents="lax"
minOccurs="0"maxOccurs="unbounded"/>
</xs:sequence>
<xs:anyAttribute namespace="##other"/>
</xs:complexType>
```

```
...
<xs:complexType name="msaSettingType">
<xs:sequence>
<xs:element name="msa"> <xs:complexType>
<xs:attribute name="active" type="xs:boolean"
user="required"/>
</xs:complexType> </xs:element>
<xs:element name="msa-video"> <xs:complexType>
<xs:attribute name="active" type="xs:boolean"
user="required" />
</xs:complexType> </xs:element>
<xs:element name="msa-audio"> <xs:complexType>
<xs:attribute name="active" type="xs:boolean"
user="required" />
</xs:complexType> </xs:element>
<xs:element name="media-text"> <xs:complexType>
<xs:attribute name="active" type="xs:boolean"
user="required" />
</xs:complexType> </xs:element>
<xs:element name="media-image"> <xs:complexType>
<xs:attribute name="active" type="xs:boolean"
user="required" />
</xs:complexType> </xs:element>
<xs:element name="msa-no"> <xs:complexType>
<xs:attribute name="active" type="xs:numerical"
user="required"/>
</xs:complexType> </xs:element>
<xs:any namespace="##other"processContents="lax"
minOccurs="0"maxOccurs="unbounded"/>
</xs:sequence>
<xs:anyAttribute namespace="##other"/>
</xs:complexType>

</xs:schema>
```
~700

FIG.7B

METHOD, UE AND SYSTEM FOR PROVIDING SIMULTANEOUS MULTIPLE SESSION POC MULTIMEDIA SERVICE IN POC SYSTEM

PRIORITY

This application claims priority to an application entitled "Method, UE And System for Providing Simultaneous Multiple Session PoC Multimedia Service in PoC System" filed in the Korean Intellectual Property Office on Nov. 15, 2005 and assigned Ser. No. 2005-109385, the contents of which are incorporated herein by reference.

BACKGROUND OF THE INVENTION

1. Field of the Invention

The present invention relates to a method, a User Equipment (UE) and a system for providing a simultaneous multiple session Push-to-talk over Cellular (PoC) multimedia service, which enable the same media to be simultaneously received at a user's request when the same media is simultaneously transmitted from different sessions in a PoC system supporting multimedia.

2. Description of the Related Art

With the rapid development of mobile communication and the spread of communication networks, an increasing array of services and applications using a cell phone have been provided. Further, since user requirements are varying, a simple communication service has been significantly expanded to such services as a location service, a multimedia service and a Push-To-Talk (PTT) service. Specifically, a PTT service supports various supplementary functions including an instant messenger and a state indication, as well as group and voice communication which can be provided by the conventional radio or Trunked Radio System (TRS).

Presently, standard establishment for a PoC service, in which such a PTT concept is provided through a mobile communication network, is being actively researched. According to the characteristics of a PoC service distinguished from an existing mobile communication service, a user belonging to multiple sessions can perform communication while navigating among the sessions. The requirements enabling a user to do so, i.e. requirements for a multiple session function, have been clearly defined in the requirements of an Open Mobile Alliance (OMA) which is responsible for defining a mobile communication service.

A PoC V2.0 system supports a PoC multimedia communication service and defines a new type of multimedia including such media as videos, images and texts, in addition to voice. Further, the PoC V2.0 system supports a multiple session function included in a conventional PoC V1.0. A current PoC system can receive multiple streams and can transfer the streams to users due to the improved performance of UEs.

However, in the current PoC system, when the same media is transmitted toward a single reception PoC UE under the multiple sessions, it is well-known that a PoC server (PF) cannot transmit the same media stream to the PoC UE at the same time. Therefore, a lower PoC UE may not receive the media streams of multiple sessions connected to the lower PoC UE even though a transmission channel supports a sufficient bandwidth. Further, the current PoC system does not provide such functions as media-based filtering for multiple multimedia, and a method for setting a corresponding session to be filtered.

SUMMARY OF THE INVENTION

Accordingly, the present invention has been made to solve the above-mentioned problems occurring in the prior art, and it is an object of the present invention to provide a method, a UE and a system for providing a simultaneous multiple multimedia service in a PoC system so that multiple media streams with the same media type can be simultaneously transmitted to a UE under multiple sessions.

It is another object of the present invention to provide a method, a UE and a system for providing a simultaneous multiple PoC multimedia service according to media types or sessions in a PoC service setup process for simultaneous multiple multimedia service in a PoC system.

In order to accomplish the aforementioned objects, according to one aspect of the present invention, there is provided a system for providing a simultaneous multiple session Push-to-talk over Cellular (PoC) multimedia service, the system including: at least one PoC User Equipment (UE) for transmitting a simultaneous multiple service request message for requesting a simultaneous multiple service, in order to simultaneously receive at least one stream with an equal multimedia type through multiple sessions, and a PoC server for providing, if the simultaneous multiple service request message is received, said at least one PoC UE with multimedia streams, which are specified by the simultaneous multiple service request message, through the multiple sessions.

According to the present invention, there is provided a method for providing a simultaneous multiple session PoC multimedia service, the method including transmitting by a PoC UE a simultaneous multiple service request message for requesting a simultaneous multiple service, in order to simultaneously receive at least one stream with an equal multimedia type through multiple sessions; and if the simultaneous multiple service request message is received, providing by a PoC server said at least one PoC UE with multimedia streams for the request of the simultaneous multiple service through the multiple sessions.

According to the present invention, there is provided a PoC UE for providing a simultaneous multiple session PoC multimedia service, the PoC UE including a data transmitter for performing packet data transmission/reception with a PoC server, a controller for transmitting a service request message for requesting a simultaneous multiple service, in order to simultaneously receive at least one stream with an equal multimedia type through multiple sessions, and performing data processing for displaying multimedia data received through the data transmitter, and a display unit for receiving and displaying the data processed by the controller.

According to the present invention, there is provided a method for providing by a PoC UE a simultaneous multiple session PoC multimedia service, the method including generating a simultaneous multiple service request message for requesting a simultaneous multiple service, in order to simultaneously receive at least one stream with an equal multime-

BRIEF DESCRIPTION OF THE DRAWINGS

The above and other objects, features and advantages of the present invention will be more apparent from the following detailed description taken in conjunction with the accompanying drawings, in which:

FIGS. 7A and 7B are diagrams illustrating additional XML schema in order to use a PUBLISH method according to the present invention.

DETAILED DESCRIPTION OF THE PREFERRED EMBODIMENT

Hereinafter, a preferred embodiment according to the present invention will be described with reference to the accompanying drawings. In the following description, the present invention is applied to a PoC system, which provides a PTT service through a cellular mobile communication network, from among PTT systems. Generally, a PoC system uses a Session Initiation Protocol (SIP) protocol and a SIP extension protocol in order to transfer session participation information of group communication, and uses an XML Configuration Access Protocol (XCAP) protocol in order to acquire group information. The following functions of the present invention can be achieved by the afore-described protocols, and the basic structure of the present invention may be based on a PoC Rel.1 system.

Figure 1:
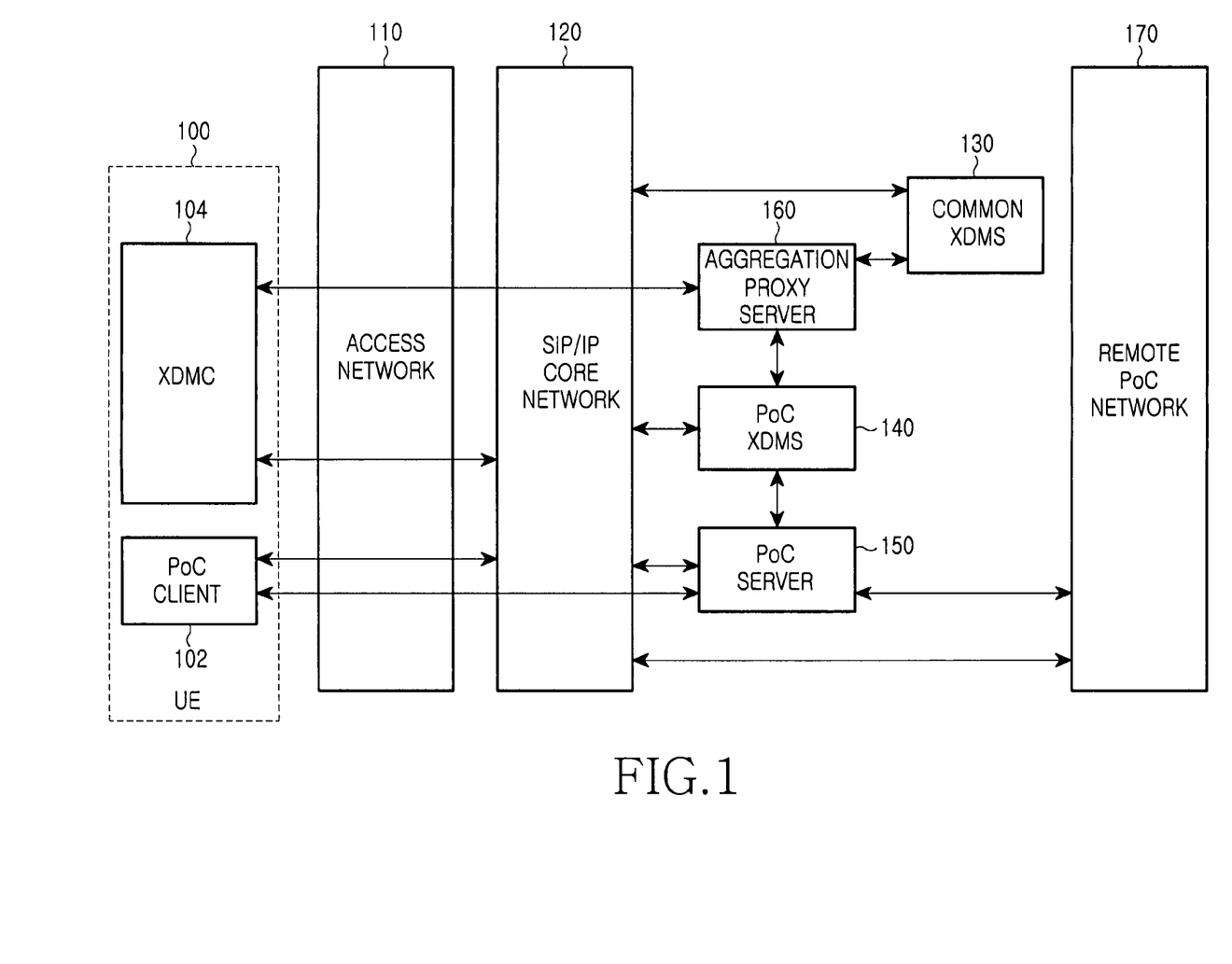
FIG. 1 is a diagram illustrating the conventional structure of a PoC service system.

FIG. 1 is a diagram illustrating the conventional structure of a PoC service system and a related network.

As illustrated in FIG. 1, the PoC system may include a PoC UE 100, XML Document Management Servers (XDMSs) 130 and 140 and a PoC server 150. the PoC system may further include an aggregation proxy server 160. These elements may be interconnected through an access network 110, a SIP/IP core network 120 and a remote PoC network 170.

The PoC UE 100 may include a PoC client 102 and an XML Document Management Client (XDMC) 104.

The PoC client 102 is a service requester mounted in the PoC UE 100, and performs network access for providing a PoC service to a PoC service subscriber while within the PoC UE 100. The PoC service subscriber may receive the PoC service through a PoC UE including a PoC client. Herein, the PoC client will be used as the general term for both a UE including a PoC client and a PoC service subscriber. Further, a reference number of a PoC client will be omitted except when stated otherwise.

The main function of the PoC client is to establish a PoC session, participate in an existing established session, or terminate an established session in terms of a PoC service subscriber, i.e. a PoC user. The PoC client generates and transfers a talk burst, supports an instant personal alert, an authentication function when accessing a PoC service, among other functions. The PoC client may be connected to the SIP/IP core network 120, which is a multimedia support core network, through the access network 110.

The SIP/IP core network 120 is connected to the servers such as PoC server 150 and the XDMSs 130 and 140, to provide the PoC service. Herein, the PoC server 150 may perform a Controlling PoC Function (CF) for maintaining and managing a PoC session, or a Participating PoC Function (PF) for participating in a PoC session originated for communication of one-to-one or one-to-many persons.

The PoC service may be accompanied by a service initiating a group session such as conference communication. To this end, an OMA standard defines the XDMC 104 and the XDMSs 130 and 140 for a group list service. FIG. 1 illustrates the PoC XDMS 140 used for the PoC service and the common XDMS 130 commonly available for another service enabler. Information about a group and group members may be input to the XDMSs 130 and 140 through the PoC client. The PoC client may learn information of other PoC clients, which may be called by the PoC client, through personal or group lists received from the XDMSs 130 and 140. The generation, modification and management of a group and group members for the XDMSs 130 and 140 may also be accomplished through a reliable communication network such as the Internet or an Intranet. Herein, details for protocols and detailed description of XML document management including the generation, modification and deletion of a group list will be omitted for the sake of conciseness.

For a group service, when the aggregation proxy server 160 receives a group list-related request from the XDMC 104, the aggregation proxy server 160 routes the request to the XDMSs 130 and 140, respectively, according to proper rules.

Figure 2:
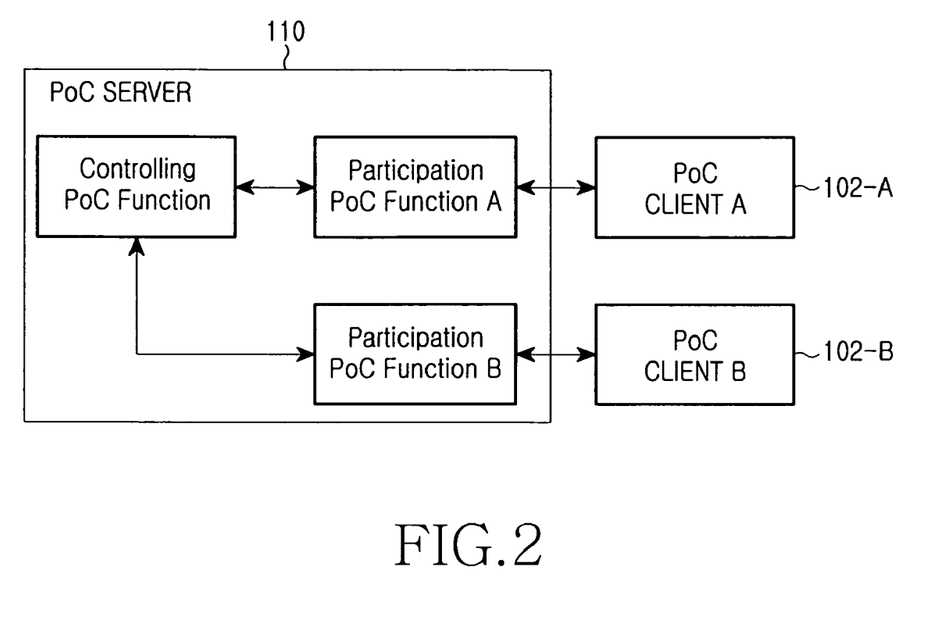
FIG. 2 is a block diagram illustrating the conventional function block of a PoC server.

FIG. 2 is a block diagram illustrating the general structure of a PoC server.

The PoC server may be classified as a CF block for generally maintaining and managing a PoC session or a PF block for controlling function maintenance between sessions. Hereinafter, the function-by-function characteristics of the PoC server will be described with reference to Tables 1 and 2 below.

TABLE 1

| Controlling PoC Function (CF) |
|---|
| Provides centralized PoC session handling |
| Provides the centralized Media distribution |
| Provides the centralized talk burst arbitration functionality including talker identification |
| Provides SIP session handling, such as SIP session origination, termination, etc. |
| Provides policy enforcement for participation in group sessions |
| Provides the participants information |
| Collects and provides centralized media quality information |
| Provides centralized charging reports |
| May provide transcoding between different codecs |
| Support talk burst control protocol negotiation |

As illustrated in table 1, the CF generally manages a PoC session from among the functions of the PoC server. Specifically, the CF receives the floor (the right to speak) request of PoC clients, determines an order, assigns authority to the PoC clients, distributes a talk burst requested by a certain PoC client to all clients having participated in group call, and provides information of the PoC clients having participated in the group call.

The PF manages sessions associated with the CF and each PoC client in a PoC session as illustrated in Table 2 below. Specifically, when a PoC client requests the floor or the CF assigns the floor to a PoC client, the PF performs a relay function. Further, the PF relays media between the CF and a PoC client, and performs transcoding when the CF and the PoC client use different codecs. In addition, in the case of simultaneous sessions, when communication is performed in one session, if communication is also performed in another session, the PF filters one of the sessions according to the selection of a PoC user.

TABLE 2

Participating PoC Function (PF)

Figure 3:
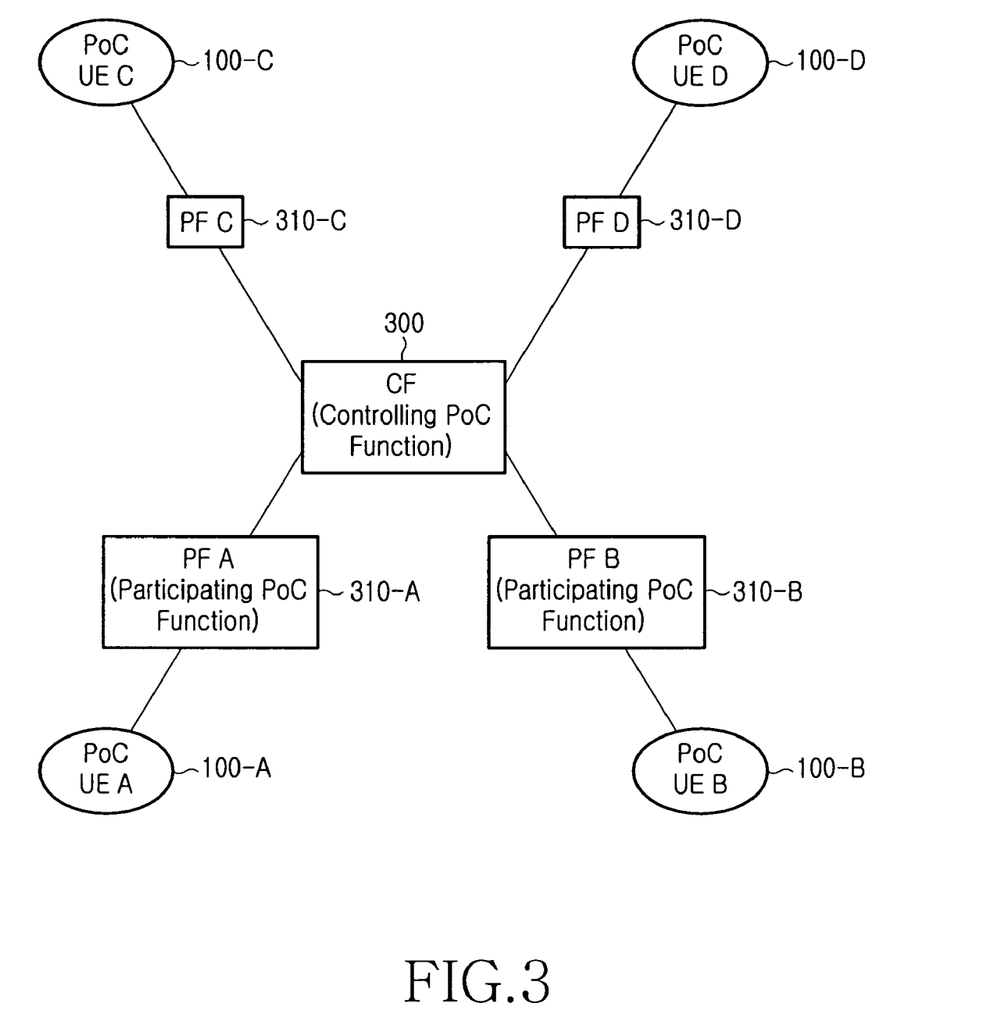
FIG. 3 is a block diagram illustrating a CF block and a PF block of a PoC server.

Provides PoC session handling
May provide the media relay function between PoC client and controlling PoC server
May provide user media adaptation procedures
May provide the talk burst control message relay function between PoC client and controlling PoC server
Provides SIP session handling, such as SIP session origination, termination, etc. on behalf of the represented PoC client
Provides policy enforcement for incoming PoC session (e.g. access control, incoming PoC session barring, availability status, etc)
May collect and provide media quality information
Provides the participant charging reports
May provide filtering of the media streams in the case of simultaneous sessions
May provide transcoding between different codecs
May support talk burst control protocol negotiation
Stores the current answer mode and incoming PoC session barring preferences of the PoC client FIG. 3 is a block diagram illustrating the CF block and the PF block of the PoC server.

Referring to FIG. 3, each of the PoC clients 102-A to 102-D accesses a CF 300 through PFs 310-A to 310-D to set a PoC session. Then, a PoC client having obtained the floor from the CF 300 transfers media for the corresponding floor to each PoC client. Herein, the PoC client having received the floor can take the floor only after checking information of a PoC client participating in a group session.

In the meantime, call processing technology for communication connection in a PoC system can be accomplished by various procedures according to requirements and situations of an originating network and a terminating network. The PoC system has the following features required by an OMA according to the setup of the originating network and the terminating network.

First, the terminating network may set its own answer mode at the request of a PoC client, and the answer mode may be largely classified as an auto-answer mode or a manual answer mode. In the auto-answer mode, if a terminating PoC client is included in a PoC client list designated by the terminating network, a corresponding network immediately transmits an answer to the originating network on behalf of the manual answer of a receiver. The transmission of the auto answer by the network on behalf of the operation of a UE occurs because a PoC server has a function of storing an answer mode and a corresponding user list according to an answer mode setup request of a UE. The manual answer mode is applied when a terminating PoC client is not included in an auto-answer user list or is obscure, or when a receiver has set an answer mode as a manual answer mode for all users. Accordingly, a PoC communication request is transmitted to a user's UE via the terminating network, and communication is connected by the permission of a PoC client.

Second, the PoC system may have an on-demand session mode and a pre-established session mode according to whether connection setup with a PoC server within a home network of a user has been established. In the pre-established session mode, a PoC client sets a session in advance between other PoC clients and a PoC server within its own home network at its own request. Such a pre-established session is a necessary function when the PoC client pre-negotiates a media parameter to be used by the PoC client with the PoC server, and rapidly performs session origination without renegotiation of a media parameter to be used between the PoC server and the PoC client.

The setup of a pre-established session is accomplished when the PoC client provides a supported media parameter to a body, i.e. a Session Description Protocol Multipurpose Internet Mail Extensions (SDP MIME) body, through an SIP INVITE method, receives a media parameter provided by a server, and responds to the media parameter. Further, a conference URI, which is identification information of a newly set pre-established session, is transferred to the PoC client together with an answer message received from the server.

When such a pre-established session is used, it is possible to prenegotiate such information as an IP address, a port number, a codec to be used and a talk burst control protocol. The on-demand session mode represents a state in which neither a PoC client nor other PoC clients has set a pre-established session. Accordingly, the PoC client performs a PoC call connection procedure after receiving INVITE from said other PoC clients.

In the PoC system, the setup of an answer mode for a communication request may be stored in both the PoC server corresponding to an element on a network and the PoC client corresponding to a UE of a user-side.

When setting an answer mode in a home network for managing the PoC client, the answer mode is performed in the PoC server for performing the PF within the home network including the PoC client.

When an answer mode has been set in a network, and another PoC server requests PoC communication, the PF immediately and automatically transmits a session progress message to a communication request network. Accordingly, when an auto-answer mode has been set, a communication request procedure is simplified and thus initial floor grant time is reduced, as compared to when a session setup message is transferred up to the PoC client and then a response is sent.

However, when a network performs an auto answer, an answer mode may also be set in the PoC client because results against the answer will of a user may be caused according to situations. Herein, the answer mode of the PoC client is prior to a different answer mode set in the network. This is for solving a privacy problem occurring when the answer mode is not reflected in realtime due to signal delay or error on the network when the PoC client changes its own answer mode and transmits an answer mode renewal request to the PoC server.

In short, in the PoC service, the answer mode of a user may be set in both a PoC server and a PoC client, but it is determined by a PoC client having reflected a user's most recent command, and media streams (such as a user's voice or images) are transferred according to such determination.

Hereinafter, a PoC multimedia session origination procedure in the PoC system having the characteristics as described above will be described. An originating PoC client transmits a multimedia invitation message by using an SIP protocol to request call processing, wherein the multimedia may include various audio, video and text formats, according to the designation of media types. In response to such a call processing request, a terminating client performs various response procedures according to whether an answer mode has been set and a pre-established session exists in a corresponding PoC server. Hereinafter, a call processing procedure for PoC communication in the same originating and terminating network will be described.

An originating PoC client sends an SIP INVITE to a corresponding SIP/IP core network, wherein the SIP INVITE includes SIP address information of a terminating PoC client, and may further include elements such as PoC address information of the originating PoC client, a required media parameter and characteristic value information indicating a PoC service. When a required session is multimedia, the required media parameter may include a plurality of characteristic values such as an encoding method regarding audio and video and a rate and a payload type.

The SIP INVITE is transferred to a participating PoC server through path query in a server such as a Dynamic Host Configuration Protocol (DHCP) server and a Domain Name System (DNS) server, via corresponding Internet Mat Server (IMS) servers, i.e. a P-CSPF, within an IMS network. In a general communication request, since a participating PoC server to which a PoC client is connected may be constructed separately from a controlling PoC server for managing a talk burst of an originated session, an SIP INVITE sent to a PF is transferred to the controlling PoC server via the SIP/IP core network of a corresponding network.

A PoC session control network including the CF transfers a SIP INVITE to a terminating network, and then receives a response message from the terminating network. The SIP message received from the terminating network may be a provisional response of 1xx, a success response of 2xx, or an error response of 4xx to 6xx, etc., according to the setup of a terminating PoC client and a PF. In an auto-answer mode, SIP 183 "session progress" may be received as an answer message, and connection may be accomplished between a PoC server and a PoC client through this message in an IMS network of a communication requester. Communication permission signals of the terminating PoC client are transferred as SIP 183 "session progress" or SIP 200 "OK", and are transferred to a PoC client via PoC servers of a CF and a PF. If 200 OK response or 183 session progress is received from a terminating PoC server, the CF determines that a PoC call has been connected, and sends floor granted signals granting a talk burst floor to an originating PoC client. The grant of talk burst authority according to the response, i.e. 200 OK or 183 session progress may be classified as "confirmed" or "unconfirmed". When the "unconfirmed" is received, the CF requires a buffering function.

The originating PoC client receives answer signals for the SIP INVITE, and then receives floor granted signals transferring talk burst transmission permission signals, e.g. ring back tone, through a Real-time Transport Control Protocol (RTCP). The floor granted signals are generated by the CF having talk burst arbitration authority, and are transmitted to a PoC client via the PF managing the corresponding PoC client. Herein, since the floor granted signals use a bearer path without using an SIP protocol, it may be transmitted without passing through the SIP/IP core network such as the IMS. The PoC client having checked the ring back tone transmits a media (e.g. voice) stream by using a Real-time Transport Protocol (RTP).

The present invention provides a scheme and a system in which, when a PoC client performing an OMA PoC multimedia communication service participates in a plurality of PoC sessions, and simultaneously receives multimedia such as images, texts and videos in addition to voice, a PF can transmit simultaneous multimedia streams according to session combinations or media without filtering.

Hereinafter, construction and operation for providing a simultaneous multiple multimedia service so that a PoC system can simultaneously transmit the same media type of multimedia streams under the multiple sessions will be described.

Figure 4:
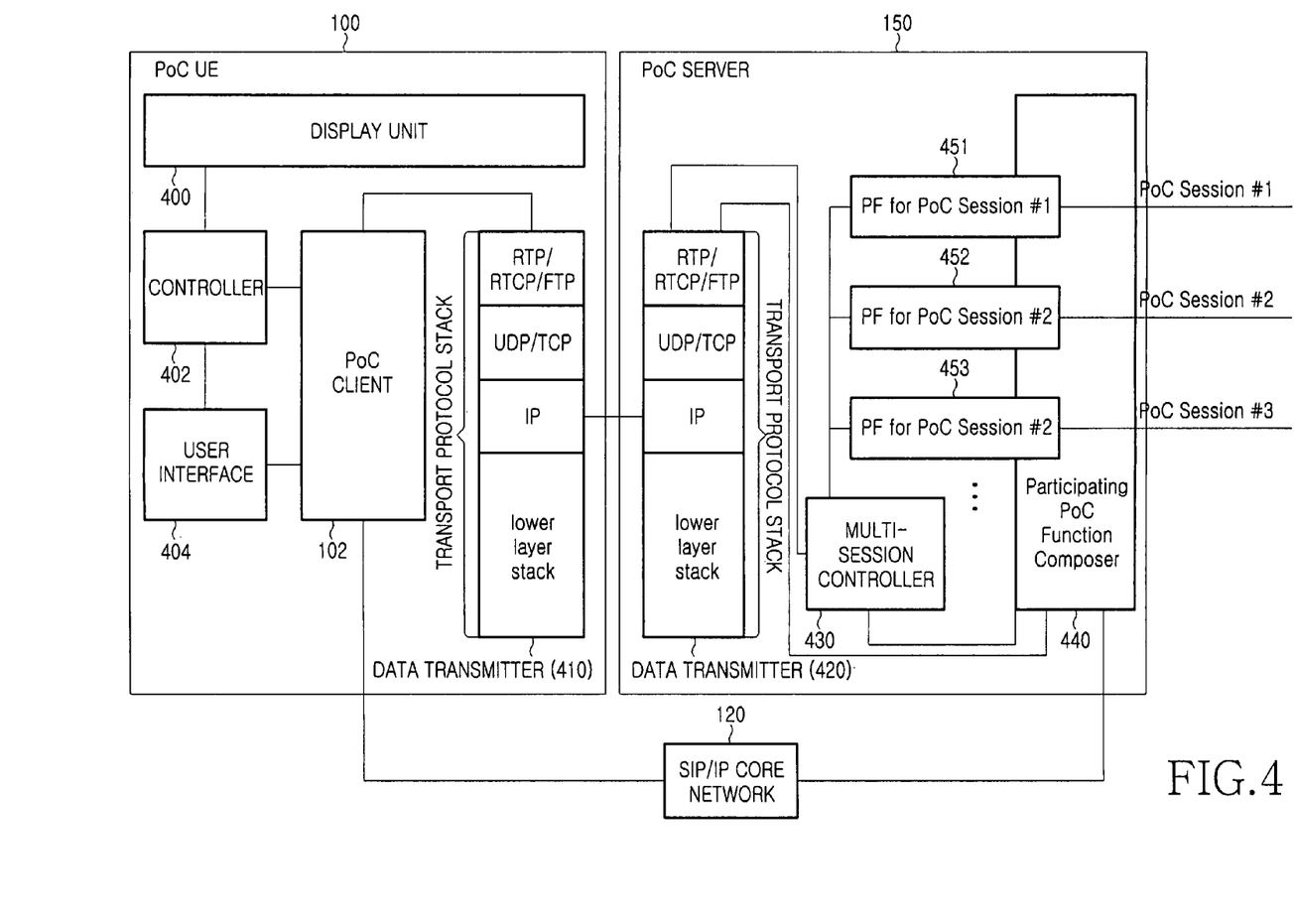
FIG. 4 is a block diagram illustrating a PoC UE and a PoC server according to the present invention.

FIG. 4 is a block diagram illustrating a PoC UE and a PoC server according to the present invention.

As illustrated in FIG. 4, the system of the present invention may include the PoC UE 100, the PoC server 150 and the SIP/P core network 120. Elements of the PoC server 150 and the PoC UE 100 will be described.

The PoC server 150 according to the present invention may function as a CF or a PF according to possession or non-possession of a group session. The present invention considers only the PF having charge of multiple session control of multimedia PoC communication. The PoC server 150 may include a data transmitter 420, a multiple session controller 430 and a Participating PoC Function composer (PF composer) 440.

The data transmitter 420 performs packet data transmission/reception, which may include transport protocol stacks for performing the packet data transmission/reception, and may also include RTP/RTCP/FTP, UDP/TCP, IP and Lower Layer Stack layers.

The multiple session controller 430 manages the filtering, transmission size, etc., of media streams of multiple sessions connected to a corresponding PoC client at the request of the PoC client. Further, the multiple session controller 430 outputs adjusted media data to the data transmitter 420.

The PF composer 440 is used in order to support multiple sessions, which controls respective multiple sessions. Further, the PF composer 440 transfers media data to the multiple session controller 430, wherein the media data is received through multiple sessions 451 to 45n.

The PoC server 150 having the construction as described above may be connected to the PoC client 102 through the SIP/IP core network 120 supporting SIP protocol-based communication.

The PoC UE 100 may include the PoC client 102, a display unit 400, a controller 402, a user interface 404 and a data transmitter 410.

The PoC client 102 requests that the PF composer 440 provide a simultaneous multiple PoC multimedia service and media adaptation through an SIP message or an RTCP message, performs media adaptation for each media session through a PF composer function, and transmits results of the media adaptation to a mobile communication network. In the present invention, the PF composer function block will not be drawn. Further, the PoC client 102 controls the controller 402 to adjust the display for corresponding media streams and to display received media to users. In the following description, the PoC client will be written as the PoC UE when appropriate.

The display unit 400 outputs visual media such as images and videos received from the PoC server 150. The controller 402 performs data processing for outputting received data to the display unit 400. The display unit 400 and controller 402 of the present invention support multimedia.

The user interface 404 transfers user input to the PoC UE 100. The user interface 404 of the present invention is constructed so that a PoC client can change a display form at the request of a PoC user. The data transmitter 410 performs packet data transmission/reception, which may include transport protocol stacks for performing the packet data transmission/reception. Further, the data transmitter 410 may include RTP/RTCP/FTP, UDP/TCP, IP and Lower Layer Stack layers.

In order to provide a simultaneous multiple session PoC multimedia service in the system, the PoC UE creates a request message in order to request a simultaneous multiple session multimedia service and transmits the service request message to a PF. Then, the PoC server applies the simultaneous multiple session multimedia service to multiple multimedia sessions originated after the PF checks the multiple session multimedia service request and sets an operation method for multiple sessions.

When the PoC UE requests the PF to provide the simultaneous multiple session multimedia service, it can designate a multimedia type for the simultaneous multiple service request and request the simultaneous multiple session multimedia service according to media types.

Further, when the PoC UE requests the PF to provide the simultaneous multiple session multimedia service, it can designate the maximum number of multimedia PoC sessions requesting the simultaneous multiple service. Further, the PoC UE may also perform a method for requesting a service while a session is in progress, in addition to a method for performing a process for requesting the PF to provide the simultaneous multiple session multimedia service before session origination.

When the PoC UE requests the simultaneous multiple service while the session is in progress, it may also be possible to apply the simultaneous multiple session multimedia service only to a corresponding session, including the ID of a session to which the service is to applied.

The simultaneous multiple service request message and answer message may principally use an SIP method. However, when the session is in progress, these messages may also be transmitted using an RTCP APP format.

The multiple PoC multimedia sessions connected to the single PoC UE may include at least one preset PoC multimedia session, or a PoC multimedia session newly requested before the preset PoC multimedia session is terminated.

Further, the PoC server may include a PF composer managing multiple PoC multimedia sessions, and a multiple session controller within a PF determining the filtering policy of the PF composer.

In the present invention, the PoC UE may include a data transmitter for performing packet data transmission/reception with the PoC server, a controller for performing data processing for displaying media data received through the data transmitter, and a display unit for receiving and displaying the data processed by the controller.

In the system of the present invention as described above, when the PoC UE 100 receives a request for the same multimedia session, it requests a filtering application for multiple session multimedia according to user's commands. Then, the PoC server 150 performs filtering for multiple sessions in response to the request from the PoC UE 100, and transmits only corresponding media data to the PoC UE 100 according to the requested filtering policy. Herein, the PoC UE 100 transmits in advance both a media type indicator to be applied when a filtering service is requested and a session ID used for adjusting a media type to the PoC server 150.

The present invention can be achieved through the use of an SIP protocol or the use of an RTCP message in a connected PoC session. The former can be achieved by newly defining an XML parameter included in an SDP body on the SIP protocol, and the latter can be achieved by defining a Media Burst Control Protocol (MBCP) message transferred through an RTCP channel connected after SIP session origination.

Hereinafter, processes of the present invention performed by the PoC UE 100 and the PoC server 150 in the system having the construction as illustrated in FIG. 4 will be described. Further, messages used for achievement of the present invention will be described with reference to the accompanying drawings together with the processes of the present invention.

Figure 5:
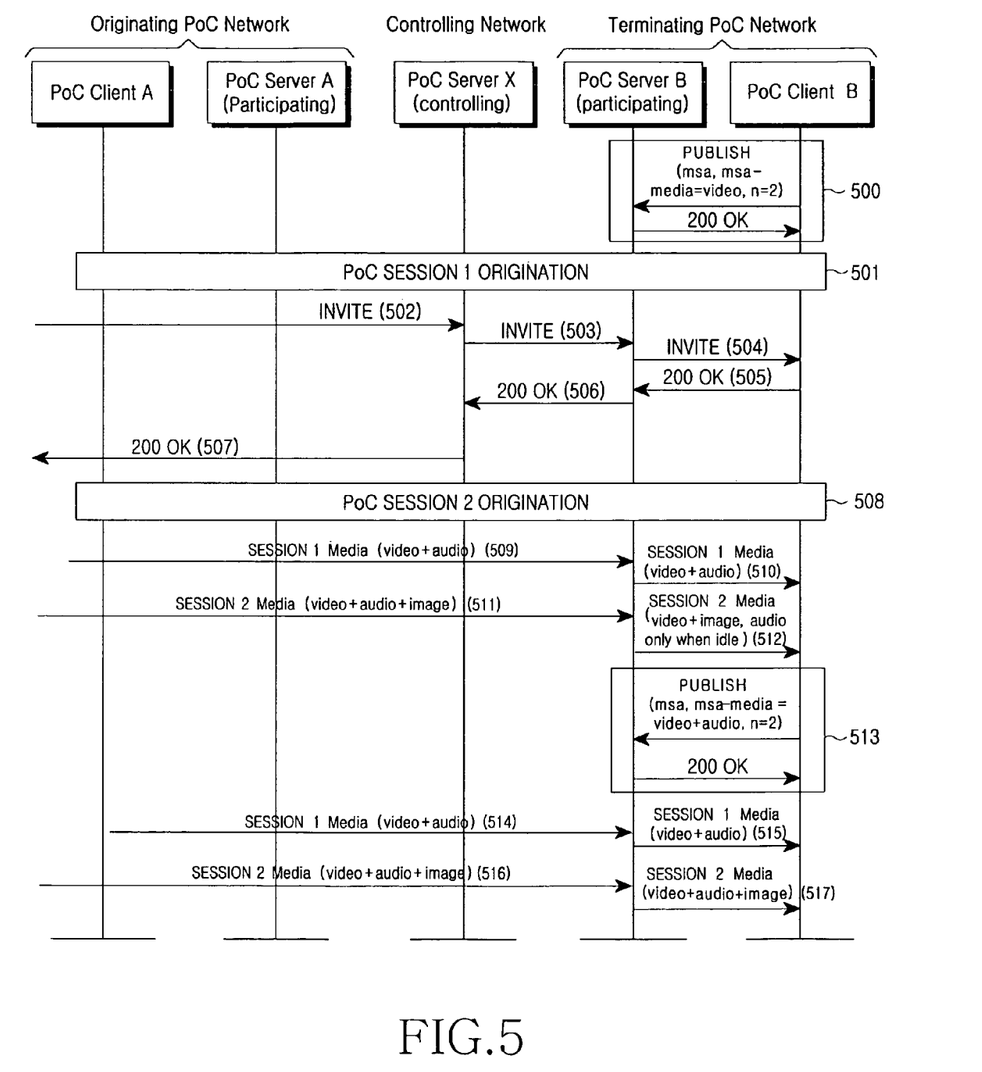
FIG. 5 is a ladder diagram illustrating a process for providing a simultaneous multiple session PoC multimedia service through PoC service between a PoC UE and a PoC server according to the present invention.

FIG. 5 is a diagram illustrating a process for providing a simultaneous multiple session PoC multimedia service through PoC service setting between a PoC UE and a PoC server according to the present invention.

Referring to FIG. 5, the process includes both a step (500) in which the PoC UE presets a simultaneous multiple session multimedia service before session origination and a step (513) in which, when multiple sessions have occurred, the PoC UE requests the simultaneous multiple service while the session is in progress.

In step (500), a PoC client B sets both the media type of the simultaneous multiple service and the number of allowable simultaneous multiple sessions in a PoC server B (PF B) through PUBLISH. In step 500, a parameter, which the PoC client B initially requests the PF B to provide, is "msa-active=true", the simultaneous multiple service is originated, the media type of the simultaneous multiple service is limited only to video, and the maximum number of allowable simultaneous multiple sessions is set to 2.

As described above, after the PoC client B sets information about the multiple session multimedia service in the PF B through the simultaneous multiple session multimedia service request before a PoC session is originated, it is assumed that a PoC session 1 is originated between a PoC client A and the PoC client B in step 501. Further, a PoC session 2 is originated through INVITE from a different PoC client other than the PoC client through steps 502 to 507.

In step 509, if video and audio data to be transmitted to the PoC client B are received in the PF B through the session 1, the PF B transmits the received video and audio data to the PoC client B.

In step 511, if video, audio and image data to be transmitted to the PoC client B are received in the PF B through the session 2, the PF B transmits only the received video and image data to the PoC client B in step 512. Herein, since the PoC client B has set a media type for receiving a simultaneous multiple service as video, the PF B can transmit the video data through the session 2. However, since the audio data is being transmitted in session 1, the audio data cannot be transmitted in session 2. The image data can be transmitted because it belongs to a media type not transmitted in session 1.

Accordingly, in the sessions 1 and 2 to be interconnected later, filtering is applied to "audio" according to values set for the simultaneous multiple service, an audio stream of a different session can be transmitted only while a stream is not transmitted in one session, e.g. a primary session. However, the audio stream may also be simultaneously transmitted according to resetting methods.

Hereinafter, a process in which a PoC UE resets the simultaneous multiple session multimedia service while a session is in progress will be described.

In step 513, when sessions 1 and 2 have begun, PoC client B sets the media type of the simultaneous multiple service as video and audio, and sets the maximum number of allowable simultaneous multiple sessions to 2 in the PF B through PUBLISH.

In step 514, if video and audio data to be transmitted to PoC client B are received in the PF B through the session 1, the PF B transmits the received video and audio data to PoC client B in step 515.

In step 516, if video, audio and image data to be transmitted to PoC client B are received in the PF B through session 2, the PF B transmits the received video, audio and image data to PoC client B in step 517. Herein, since PoC client B has set the media type for receiving the simultaneous multiple service as audio as well as video, the PF B can transmit the video, audio and image data through session 2.

That is, the media types preset by the PoC client can be provided in all sessions in which the simultaneous multiple service is possible. However, in the case of different media types, if the media types are being provided in one session, the media types cannot be provided in other sessions.

Figure 6:
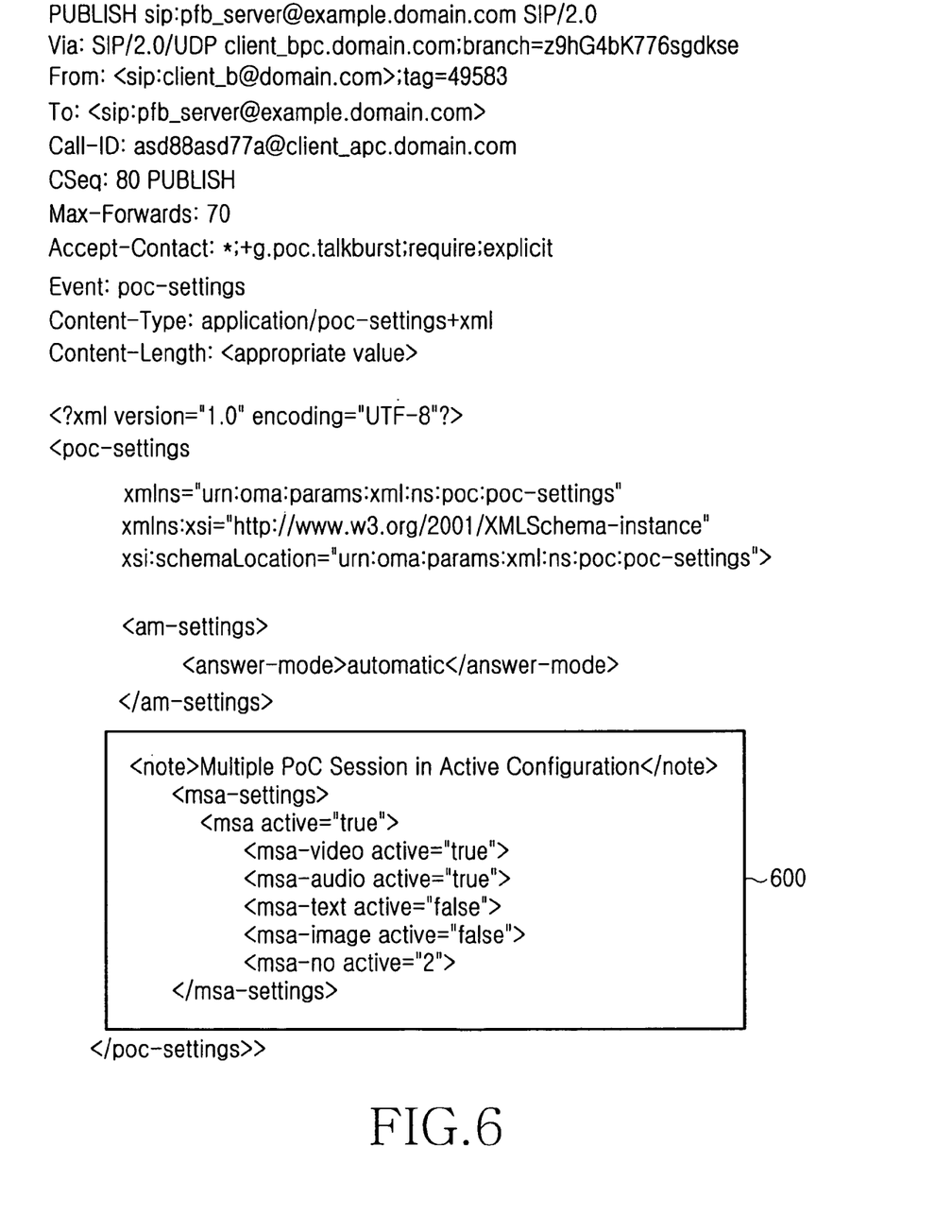
FIG. 6 is a diagram illustrating a preferred format of a PUBLISH method in order to set a PoC box service in the procedure in FIG. 5, according to the present invention.

FIG. 6 illustrates a preferred embodiment using an SIP PUBLISH method in order to provide the simultaneous multiple PoC multimedia service, which is proposed by the present invention. Referring to FIG. 6, a PoC UE further includes a service parameter 600 referred to as "msa-setting" for adjusting the filtering characteristic of a PF, in addition to a conventional PoC service setting parameter. Herein, the PoC UE indicates whether to apply filtering according to media types as binary values, and sets the maximum number of allowable simultaneous multiple sessions to 2.

Figure 7A:
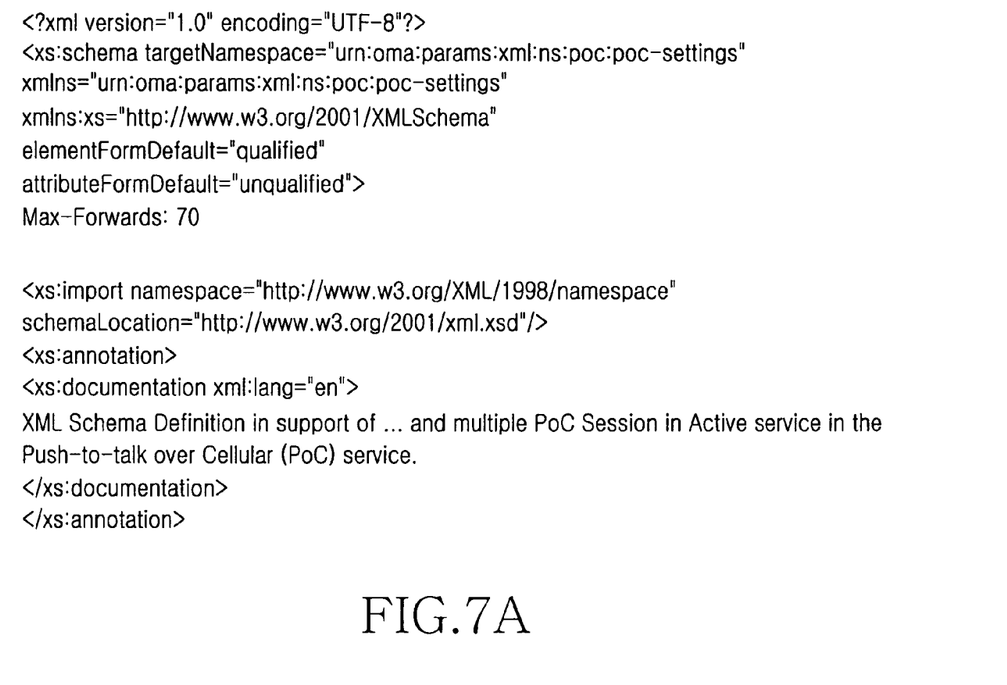

FIGS. 7A and 7B illustrate an additional XML schema of a "PoC Service Settings" value requiring a new definition in order to user the PUBLISH method. The additional XML schema is as illustrated in FIG. 7B in reference number 700, and basically defines a simultaneous multiple service request field, a corresponding media type field and a field including the maximum number of multiple sessions.

When the simultaneous multiple session multimedia service is requested while a session is in progress as described above, whether to apply the simultaneous multiple service according to sessions may also include PUBLISH which is a simultaneous multiple service request message. When such a method is applied, it may also be possible to provide a service for two specific sessions or a number of sessions among a plurality of multiple sessions.

As described above, the present invention can be performed through an SIP protocol or an RTCP protocol. Even when the RTCP protocol is used, a process before an SIP answer for INVITE is equal to that when the SIP protocol is used. However, when the RTCP protocol is used, a filtering service request from a PoC client to a PF can be accomplished through transmission of an MBCP message through an RTCP channel of an originated session. The MBCP message uses the following RTCP APP format.

That is, the first row indicates information such as version information, subtype information, packet types and packet length. The second row includes address information of a PF performing filtering for a simultaneous multiple service. The third row indicates a PoC release version. Rows after the fourth row may include information such as a field designating a simultaneous multiple session multimedia service, a field indicating a corresponding media type and the maximum number of allowable service sessions. Further, these rows may selectively include an ID field of a session to which a simultaneous multiple service is to be applied. Subsequent bit information may be set as a zero padding value capable of including additional information. Each of the rows as described above has a size of 32 bits.

In the present invention, the name of a parameter designated in a specific embodiment does not restrict the parameter itself. Even when the parameter has different names, the parameter can be applied to other parameters with the same function as that of the parameter.

According to the present invention as described above, multiple PoC multimedia services can be simultaneously provided to one PoC client. Further, the present invention enables application of a simultaneous multiple multimedia service according to media types or session IDs for respective media streams simultaneously provided to one PoC client, so that it is possible to effectively use improved functions of a PoC UE such as reception using a PoC box, and display of multiple multimedia.

In addition, when a session origination request including the same multimedia is transmitted to a PoC client participating in multimedia PoC session communication, the PoC client establishes a filtering policy, thereby causing multimedia streams to be simultaneously transmitted from a plurality of PoC multiple sessions. To this end, the present invention can simultaneously display two or more image streams or images to one UE, can store two or more received voice streams in a PoC box, or can also reproduce the voice streams as background voice.

Although a preferred embodiment of the present invention has been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A User Equipment (UE) for providing a simultaneous multiple session multimedia service, the UE comprising:
   a data transmitter for performing packet data transmission/reception with a server;
   a controller for transmitting a simultaneous multiple session multimedia service request message for requesting a simultaneous multiple service, in order to simultaneously receive at least one stream with an equal multimedia type through multiple sessions, receiving a simultaneous multiple session multimedia service response message including media type of the simultaneous multiple session multimedia service and the number of allowable simultaneous multiple sessions, setting the media type of the simultaneous multiple session multimedia service and the number of allowable simultaneous multiple sessions, and receiving a media type data of the simultaneous multiple session multimedia service from the server; and
   a display unit for receiving and displaying the data processed by the controller.

2. The UE as claimed in claim 1, wherein the UE transmits the simultaneous multiple service request message to the server before session origination, and thus sets the simultaneous multiple service.

3. A method for providing, by a User Equipment (UE), a simultaneous multiple session multimedia service, the method comprising the steps of
   transmitting a simultaneous multiple session multimedia service request message for requesting a simultaneous multiple service, in order to simultaneously receive at least one stream with an equal multimedia type through multiple sessions;
   receiving a simultaneous multiple session multimedia service response message including media type of the simultaneous multiple session multimedia service and the number of allowable simultaneous multiple sessions;

setting the media type of the simultaneous multiple session multimedia service and the number of allowable simultaneous multiple sessions; and receiving a media type data of the simultaneous multiple session multimedia service from the server.

4. The method as claimed in claim 3, wherein the UE transmits the simultaneous multiple service request message to the server before session origination, and thus sets the simultaneous multiple service.

5. A User Equipment (UE) for providing a simultaneous multiple session multimedia service, the UE comprising:

a data transmitter for performing packet data transmission and reception with a server;

a controller for controlling to transmit a simultaneous multiple session multimedia service request message for requesting a simultaneous multiple service, in order to simultaneously receive at least one stream with a same multimedia type through multiple sessions, the simultaneous multiple session multimedia service request message including a media type of the simultaneous multiple session multimedia service and a number of allowable simultaneous multiple sessions, the controller further controlling to receive a simultaneous multiple session multimedia service response message and media type data of the simultaneous multiple session multimedia service through the data transmitter from the server, and for processing the received media type data of the simultaneous multiple session multimedia service through multiple sessions; and a display unit for displaying the data processed by the controller.

6. The UE as claimed in claim 5, wherein the media type of the simultaneous multiple session multimedia service is at least one of video, audio and image and is capable of differently requesting each session.

7. The UE as claimed in claim 5, wherein the number of allowable simultaneous multiple sessions is a maximum number of allowable simultaneous multiple sessions.

8. The UE as claimed in claim 5, wherein the controller is configured to control to transmit the simultaneous multiple session multimedia service request message for presetting the simultaneous multiple session multimedia service before a session origination is described.

9. The UE as claimed in claim 5, wherein the controller is configured to control to transmit the simultaneous multiple session multimedia service request message for changing the preset simultaneous multiple session multimedia service after the multiple sessions have originated.

10. A method for providing, by a User Equipment (UE), a simultaneous multiple session multimedia service, the method comprising the steps of:

transmitting a simultaneous multiple session multimedia service request message for requesting a simultaneous multiple service, in order to simultaneously receive at least one stream with a same multimedia type through multiple sessions;

requesting a message including a media type of the simultaneous multiple session multimedia service and a number of allowable simultaneous multiple sessions;

receiving a simultaneous multiple session multimedia service response message;

receiving media type data of the simultaneous multiple session multimedia service through a data transmitter from a server; and processing the received media type data of the simultaneous multiple session multimedia service through multiple sessions.

11. The method as claimed in claim 10, wherein the media type of the simultaneous multiple session multimedia service is at least one of video, audio and image and is capable of differently requesting each session.

12. The method as claimed in claim 10, wherein the number of allowable simultaneous multiple sessions is a maximum number of allowable simultaneous multiple sessions.

13. The method as claimed in claim 10, wherein the simultaneous multiple session multimedia service request message for presetting the simultaneous multiple session multimedia service is transmitted before a session origination is described.

14. The method as claimed in claim 10, wherein the simultaneous multiple session multimedia service request message is for changing the preset simultaneous multiple session multimedia service and is transmitted after the multiple sessions have originated.

* * * * *